Jan. 25, 1949. D. A. DALTON 2,460,216
DISCONNECTIBLE UNIVERSAL JOINT
Filed Jan. 10, 1945
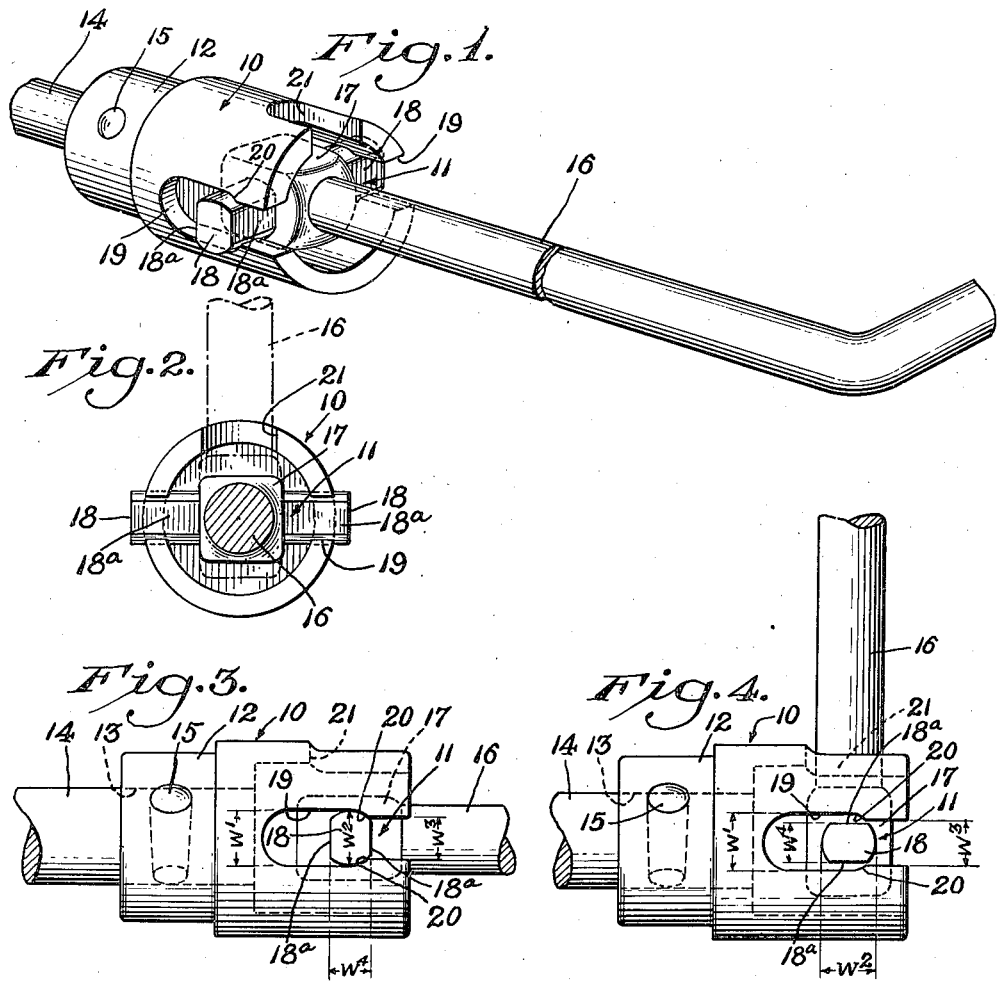
Inventor
Donald A. Dalton
BY
Carson, Pitzner, Hubbard & Wolfe
Attorneys.

Patented Jan. 25, 1949

2,460,216

UNITED STATES PATENT OFFICE 2,460,216

DISCONNECTIBLE UNIVERSAL JOINT

Donald A. Dalton, Warsaw, Ind., assignor to The Dalton Foundries, Incorporated, Warsaw, Ind., a corporation of Indiana Application January 10, 1945, Serial No. 572,141

1 Claim. (Cl. 64—8)

The present invention pertains to universal joints, the general aim being to provide such a joint which is strong and rugged, economical to make in quantity production and which is adapted to serve as a readily disengageable coupling.

Joints embodying the present invention find utility in various fields, one example being their use as a coupling for connecting an actuating handle to the operating screw of a scissors type jack such as that disclosed in the patent to Earl W. Conrad, No. 1,954,558, issued April 10, 1934. The presently disclosed joint has operating characteristics particularly adapting it to such use as will hereinafter appear.

Further objects and advantages of the invention will become apparent as the following description proceeds, taken in connection with the accompanying drawing in which:

Figure 1 is a perspective view of a disconnectible universal joint embodying the present invention.

Fig. 2 is an end elevation of the joint of Fig. 1 with the handle portion shown in transverse section.

Figs. 3 and 4 are side elevations of the joint of Fig. 1 and with the handle portion shown respectively in operating position and in position suitable for effecting assembly or disassembly of the joint.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claim.

Referring more particularly to the exemplary embodiment of the invention herein illustrated, it will be seen upon reference to Fig. 1 that the particular joint there shown comprises a generally tubular socket member 10 and a T-head 11. Protruding from the outer end of the socket 10 is an integral shank 12 of slightly reduced outer diameter and having an axial bore 13 therethrough to receive the end 14 of some member which is to be connected by the joint such, for example, as the operating screw of a scissors type jack. The inserted member 14 is rigidly secured to the shank 12 by a transverse pin 15.

The T-shaped head 11 is in this instance shown as fashioned on one end of an elongated operating handle suitable for use with a jack. Thus it comprises a rod 16 constituting the stem of the T and having an enlarged head 17 of square cross section rigid therewith. Fixed in a transverse aperture in this head 17 is a transverse member of round cross section, fashioned, for example, from round bar stock or rock, and constituting the laterally projecting arms 18 of the T-head, such arms being relieved to present diametrically opposite flat side faces 18ª on each of them facing axially of the stem.

The laterally projecting arms 18 of the T-head are received in slots 19 in the socket member 10. Such slots extend longitudinally of the socket member along diametrically opposite sides of the same and lead from the inner end of such socket member. The inner portions of these slots are of a width $w^1$ (Fig. 3) slightly greater than the thickness $w^2$ of the arms 18 in a direction transaxially of the stem 16. The outer end portions of the slots 19 are, on the other hand, of a reduced width $w^3$ to define shoulders at 20 which are preferably slightly rounded in conformity with the contour of the arms 18. The width $w^3$ of the narrow ends of the slots 19 is less than the thickness $w^2$ of the arms 18 in a direction transaxially of the stem 16 but slightly greater than the thickness $w^4$ of these arms between the flat faces 18ª, that is, in a direction axial of the stem 16. By reason of this relative dimensioning of the parts, the arms 18 can pass through the narrow open ends of the slots 19 only when turned in the position shown in Fig. 4 in which the stem or handle 16 lies substantially at right angles to the axis of the socket member 10. Once the arms 18 of the T-head 11 are entered into the enlarged inner portions of the slot 19, however, the handle 16 can be turned down into the position of Fig. 3 and in which latter position separation of the T-head 11 from the socket member 10 is prevented by the engagement of the arms 18 with the shoulders 20.

A third slot 21 is provided in the side wall to the socket member 10 substantially midway between the diametrically opposed pair of slots 19 in order to afford clearance for the handle 16 when the latter is swung upward into the position of Fig. 4. It should also be noted that the enlarged inner portions of the slots 19 are of a length which is substantially greater than the minor thickness $w^4$ of the arms 18 so that when the T-head 11 has been engaged with the socket member 10 (Fig. 3) the parts 10, 11 are free to swing relative to each other about an axis normal to the plane of the T-head arms 18 through a substantial arc.

In using the joint illustrated the parts 10, 11 are connected by entering the T-head arms 18 into the slots 19 with the T-head 11 positioned relative to the socket member 10 as shown in Fig. 4. In other words, the stem of the T or handle 16 is located at right angles to the axis of the socket member 10 so that the flattened arms 18 may pass through the narrow outer ends of the slots 19. Once the arms 18 have thus been entered into the enlarged inner portions of the slots 19 the handle 16 is swung down into the position of Fig. 3, whereupon the assembly of the parts is complete. Having thus connected the T-head 11 with the socket member 10 these two members 10, 11 may be moved relative to each other with a substantially universal motion of wide angular limits without danger of inadvertent disengagement. To disengage the T-thread 11 from the socket member 10 it is necessary only to turn the handle or stem 16 in the right angle position of Fig. 4 and then withdraw the arms 18 through the narrow outer ends of the slots 19.

When a device like that described is used for connecting a handle to the operating screw of a scissors type jack, the principal loads imposed during operation are torsional. In other words, the principal load encountered is that incident to turning the handle 16 for revolving the operating screw of the jack. Such load is imposed by way of forces applied from the T-head arms 18 against the side walls of the inner portions of the slots 19 so that there is little danger of damaging the joint even under heavy loads. On the other hand, the shoulders 20 need not be of very great area, since tension loads on the handle 16, tending to pull the arms 18 past the shoulders 20 (while in the position of Fig. 3), are comparatively minor so that there is little tendency to distort the socket member 10 by spreading the outer ends of the slots 19. It will thus be seen that a strong and rugged joint has been afforded which can be manufactured at low cost in view of its overall simplicity of construction. Moreover, it can be readily assembled and disassembled by even a comparatively unskilled user and without necessity of any complicated set of instruction.

I claim as my invention:

A disconnectible universal joint for operating an automobile jack or the like comprising, in combination, a T-shaped head including a stem with a pair of generally cylindrical arms projecting laterally at opposite sides thereof, said arms being relieved to provide diametrically opposed flat faces and assembled into the stem with their major diameters disposed in a direction trans-axially of the stem and their minor diameters disposed in a direction axially of the stem, a tubular socket member internally dimensioned to receive said head and having longitudinal slots at diametrically opposite points in its side walls opening at the ends of the member for the reception of said arms, said slots having a width adjacent their inner ends slightly greater than the major arm diameter to permit the head to rock freely about the longitudinal axes of said arms, the outer end portions of said slots having a width slightly greater than the minor arm diameter and defining inwardly facing shoulders operative to confine said arms within the inner portions of said slots when said stem is disposed in any position other than normal to the axis of said socket member, said inner portions of the slots being of sufficient length to permit lateral rocking of the head with said arms fulcrumed on the shoulder in either of said slots, and said socket member also having a third slot opening from said one end and extending longitudinally thereof substantially midway between said first mentioned slots to afford clearance for swinging said stem into a position normal to the axis of said socket member whereby to present the minor diameter of said arms for insertion through or removal from the first mentioned slots.

DONALD A. DALTON.

REFERENCES CITED

The following references are of record in the file of this patent:

UNITED STATES PATENTS

| Number | Name | Date |
| --- | --- | --- |
| 283,940 | Wheeler | Aug. 28, 1883 |
| 1,036,144 | Plank | Aug. 20, 1912 |
| 1,447,934 | Edwards | Mar. 6, 1923 |
| 1,478,324 | Dina | Dec. 18, 1923 |

FOREIGN PATENTS

| Number | Country | Date |
| --- | --- | --- |
| 341,586 | Great Britain | 1931 |
| 778,354 | France | 1935 |